Oct. 11, 1949.　　　　　E. B. MEAD　　　　2,484,235
INCLINED DRUM POULTRY PICKER
Filed Dec. 14, 1945　　　　　　　　　2 Sheets-Sheet 1
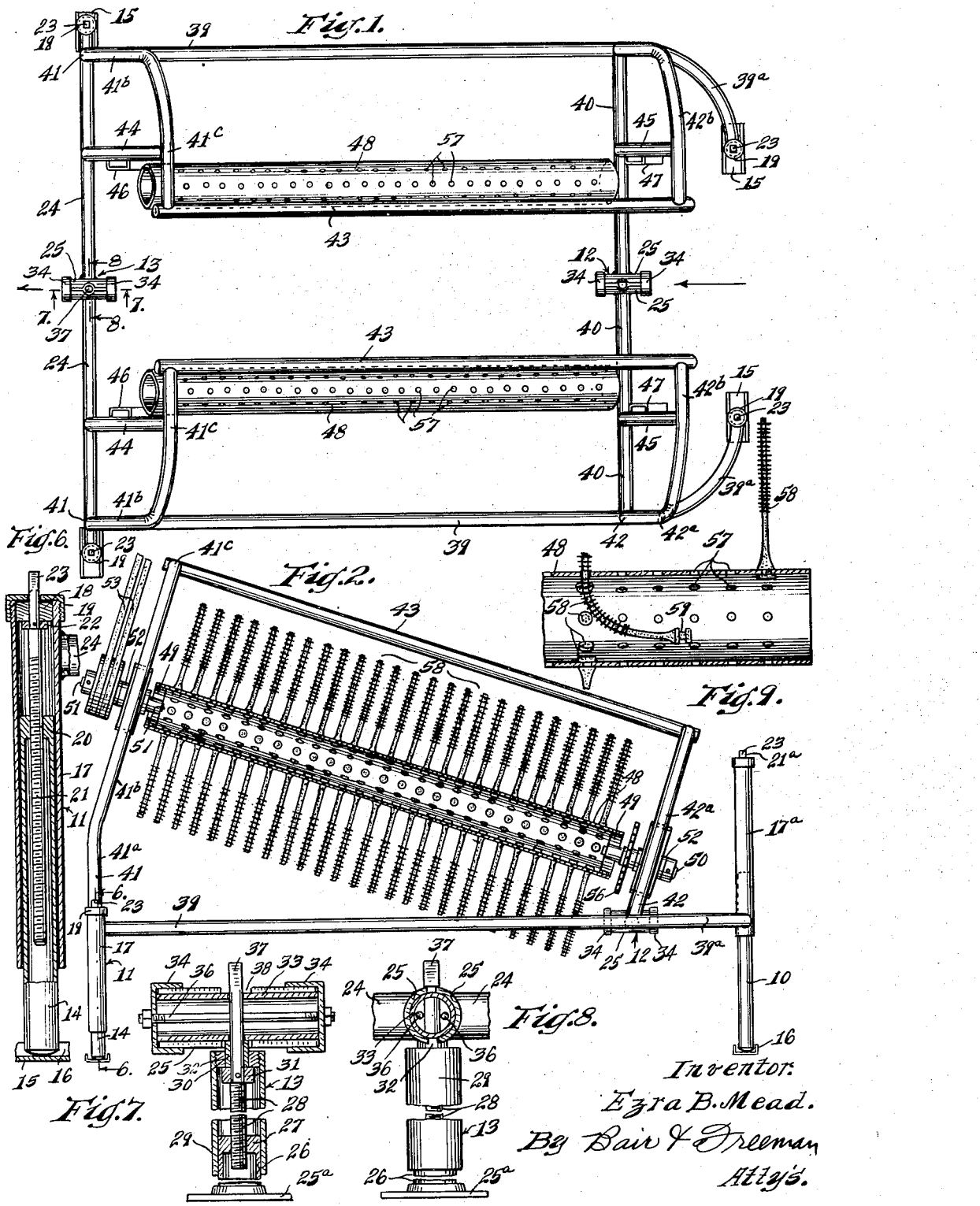
Inventor:
Ezra B. Mead.
By Bair & Freeman
Attys.

Oct. 11, 1949.   E. B. MEAD   2,484,235
INCLINED DRUM POULTRY PICKER
Filed Dec. 14, 1945   2 Sheets-Sheet 2
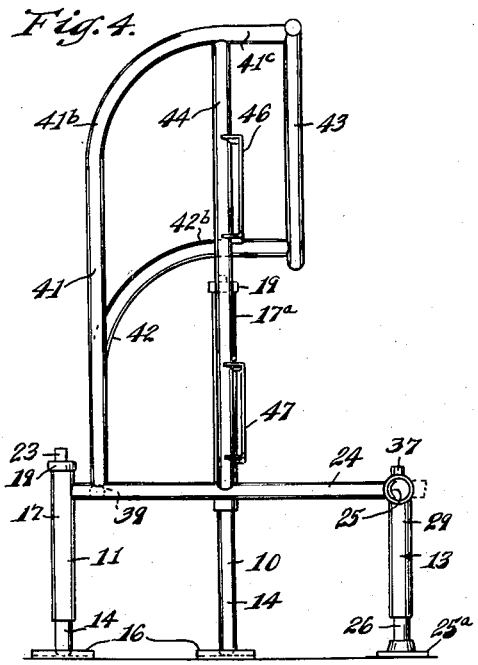
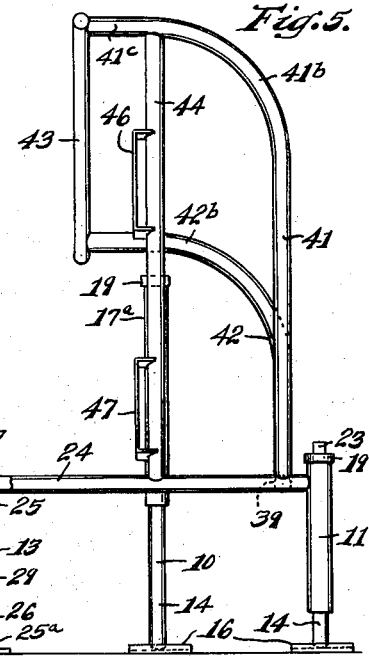
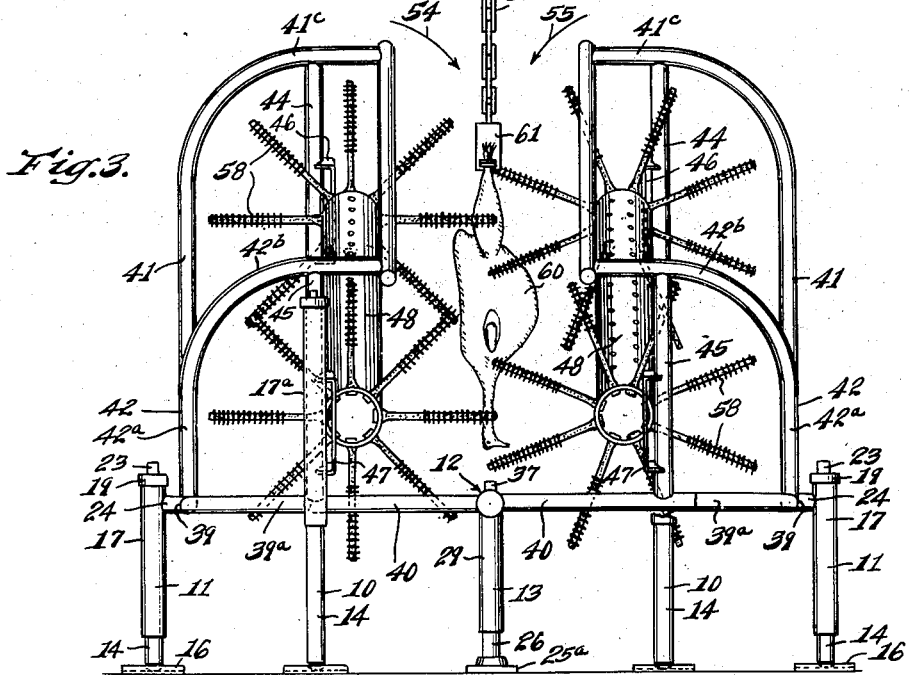
Inventor:
Ezra B. Mead.
By Bair & Freeman
Atty's.

Patented Oct. 11, 1949

2,484,235

UNITED STATES PATENT OFFICE 2,484,235

INCLINED DRUM POULTRY PICKER

Ezra B. Mead, Ottumwa, Iowa, assignor to Barker Poultry Equipment Co., Ottumwa, Iowa, a corporation of Iowa Application December 14, 1945, Serial No. 634,962

9 Claims. (Cl. 17—11.1)

My present invention relates to poultry pickers of the general type employing rotating drums provided with resilient fingers.

It is my purpose to provide a poultry picker employing a pair of such drums arranged substantially parallel to each other and inclined at an angle between vertical and horizontal so that when placed in the path of birds carried by a conveyor, the birds will be carried between the drums and be by them mechanically picked cleaner and faster than heretofore by automatic machines.

Another and important purpose is to provide means for mounting the drums so that they can be easily and conveniently adjusted toward and from each other for achieving the greatest operating efficiency on birds of all sizes.

Another purpose is to provide for mounting the drums for such an adjustment by means which will not interfere with travel of the birds for picking.

Still another purpose is to provide drums and mountings which permit convenient replacement of broken or worn fingers.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a plan view of an inclined drum picker embodying my invention.

Figure 2 is a side elevation of the same.

Figure 3 is a front elevation of my improved picker, parts being omitted for a clear showing of the parts illustrated.

Figure 4 is a rear elevation of the frame structure for one drum.

Figure 5 is a similar view of the frame structure for the other drum.

Figure 6 is a detail sectional view of one of the frame supporting legs taken on the line 6—6 of Figure 2.

Figure 7 is a detail sectional view taken on the line 7—7 of Figure 1, illustrating the common support for the frames for the respective drums at the rear end of the picker.

Figure 8 is a front elevation of the same structure partly in section on the line 8—8 of Figure 1.

Figure 9 is a longitudinal sectional view through a portion of one of the drums for illustrating the manner in which the resilient fingers may be installed.

It has been the practice heretofore to build automatic chicken pickers including a pair of parallel drums arranged side by side as may be illustrated in the Barker Patent No. 2,389,404. I find that by the arrangement herein described, certain advantages as above mentioned are attained.

In my present structure I provide two drums. Each drum has a frame portion. Such portions are shown in Figures 4 and 5. Each frame portion has an outer supporting leg 10 at its front end and an outer supporting leg 11 at its rear end. I refer to the front end as the one from which the birds approach in the structures here shown. It would of course be possible to bring the birds first to the other end of the drum, but at present I provide the arrangement here illustrated. The frame portions have a common supporting leg 13 at the rear end. The common leg 13 is shown in connection with both portions in Figures 4 and 5.

The legs 10, 11 and 13 are adjustable in the manner hereinafter more fully described, for the purpose of tilting the drums toward and from each other for adjusting their relative positions for picking birds of different sizes.

The detailed structure of the legs 10 and 11 is illustrated in Figure 6. Each leg has a lower tubular member 14 as shown in Figure 6 resting loosely in a short channel 15, which is placed on the floor transversely of the machine so that its flanges 16 prevent any forward or rearward movement of the machine when the channel 15 is secured to the floor. The leg member 14 rests on the bottom of the channel 15 so that the upper part of the leg can be tilted slightly toward or from its corresponding leg. Each of the legs 10 and 11 has an upper member 17 telescoped over the upper part of the leg member 14. At the upper end of the tubular leg member 17 is a filler ring 18, welded or otherwise fixed to the underside of a cap 19 screwed on to the top of the leg member 17.

At the upper end of the leg member 14 is the top 20 through which is threaded an adjusting rod 21. The adjusting rod extends upwardly through the filler ring 18 and the cap 19 so as to permit rotation of the rod 21 with relation to the filler ring 18 and cap 19. Fixed on the rod 21 adjacent the underside of the ring 18 is a lock washer 22. The projecting upper end of the rod 21 is made angular at 23 to receive a wrench. It will be obvious that by rotating the rod 21, it will have up and down screw-threaded adjustment with relation to the leg portion 14 for thereby relatively raising and lowering the leg portion 17.

Welded or otherwise fixed to the upper part of each leg portion 17 of each leg 11 is a transverse frame member 24 (see Figures 1 and 6). These members 24 extend toward each other and are fixed at their inner ends to fore and aft extending channel-like members 25 forming part of the structure at the top of the rear leg 13 common to the two frame portions. The leg 13 has a base 25a to rest on the floor. Fixed to and extending upwardly from the base 25a is a tubular leg member 26, having a closed upper end 27 through which is threaded the adjusting rod 28. Telescoped over the leg member 26 is an outer tubular leg member 29. Screwed into the upper end of each leg member 29 is a filler ring 30. Fixed on the adjusting rod 28 immediately below the ring 30 is a collar 31. The collar 31 supports a sleeve 32 rotatably journaled in the ring 30 and abutting a short tube 33 extending fore and aft of the picker.

The channel-shaped members 25 form slightly less than half cylinders and fit against the opposite sides of the tube 33 and are held thereon by means of end caps 34 through which extend tie bolts 36. The rod 28 extends upwardly through the tube 33 and has an angular head 37 to receive a wrench. Channel members 25 have notches 38 to accommodate the rod 28 so as to permit the channel members to rock around the tube 33 slightly when the outer ends of the frame members 24 are raised or lowered or when the leg member 29 is raised and lowered by adjusting the rod 28.

It will thus be seen that the outer rear legs 11 are vertically adjustable and the rear leg 13 is vertically adjustable. The front legs 10 are constructed substantially like the legs 11 except that the parts thereof indicated at 17a and the adjusting rods thereof indicated at 21a in Figure 2, are longer than the parts 17 and 21 of the legs 11.

Fixed to each transverse frame member 24 near each rear outer leg 11 is a horizontal side frame member 39, preferably a piece of pipe which at its front end is curved inwardly as at 39a, Figure 1, and at its extreme front end is fixed as by welding to the lower part of the leg member 17a (see Figures 1 and 2).

Fixed to the longitudinal frame members 39 just rearwardly of their inwardly curved front ends 39a are transverse frame members 40 extending toward each other and connected together by mechanism indicated generally at 12 in Figure 1, which is like that shown in Figures 7 and 8 except that there is no supporting leg. Thus the members 40 have a pivotal connection, which is in line with the axis of the tube 33 of the leg 13.

Fixed to each member 24 near its leg 11 is a tubular frame member 41. These members 41 are illustrated in Figures 1, 2 and 4. Each has a portion 41a extending upwardly and a portion 41b extending from the portion 41a upwardly and forwardly as perhaps best illustrated in Figure 2. At the upper end of the portion 41b the frame member 41 is curved inwardly toward the opposite side of the machine forming a portion 41c.

At the front of the machine a tubular member 42 is fixed to each frame member 39 and has a portion 42a inclined upwardly and forwardly as illustrated in Figure 2. At the upper end of the portion 42a is a portion 42b curved inwardly toward the center of the machine as perhaps best illustrated in Figure 3. Thus there are two frame members 41 at the rear of the machine, one on each side, and there are two members 42 at the front of the machine, one at each side. The upper ends of the portions 41c and 42b of the frame members 41 and 42 at each side of the machine, are connected by rigid longitudinal frame members 43. At the rear end of the machine are two frame members 44. Each is fixed at its lower end to a frame member 24 and is inclined upwardly and forwardly and secured at its upper end to a part 41c of a frame member 41, spaced laterally and outwardly from the frame member 43, as shown in Figures 1, 3 and 4.

At the front end of the machine are two frame members 45. Each member 45 is fixed at its lower end to a transverse frame member 40 and is inclined upwardly and forwardly and fixed at its upper end at 42b to a frame member 42 at a point spaced laterally and outwardly from the respective frame member 43 (see Figures 1 and 3).

In Figure 3 the upper part of one of the leg members 17a is broken away to permit the showing of the frame member 45 for its full length.

On the members 44 are mounted brackets 46 and on the members 45 are mounted brackets 47, Figures 1 and 3. The drums are supported on these brackets for rotation.

*Drums*

Each picker drum has a tubular drum member 48. These drum members are shown with parts omitted in Figure 1, and one is shown in section in Figure 2. At each end of each drum member is a spider 49 (omitted in Figure 3). From the spiders 49 at the front and rear of the machine project stub shafts 50 and 51. These stub shafts are journaled in bearing bosses 52 which may be provided with any kind of ball or roller bearing and are mounted on the respective brackets 46 and 47 so that the drums are parallel with each other and are inclined upwardly from front to rear as clearly illustrated in Figure 2. The stub shafts 51 are arranged to be rotated by suitable driving mechanisms 53. Since the driving mechanism itself forms no part of my present invention, I have not purported to fully illustrate it. Any conventional drive can be used to rotate the drums in opposite directions, as illustrated by the arrows 54—55 in Figure 3.

56 shows throw rings to throw water off by centrifugal force so the water will not run down into the bearings.

In Figure 9 I have shown a section of one drum for the purpose of illustrating the manner in which the resilient fingers may be installed. Each drum 48 is provided with a plurality of holes 57. The fingers 58 are inserted between the spokes of the spider 49 with a suitable tool and the small ends of the finger are inserted through the holes 57 from the inside, as shown at the left-hand part of Figure 9. The end of a finger projecting through a drum is then grasped for pulling the finger into position, shown at the right-hand end of Figure 9. The inner end of each finger has a reduced neck 59 to fit in one of the holes 57. The birds 60 are hung by their feet on shackles 61 supported by chains 62 from a conveyor 63.

*Operation*

In actual operation the birds are carried on the shackles 61 to cause them to travel between the rotating drums of the picker. They enter between the picker drums at the lower ends thereof so that the necks will be cleanly picked and as the birds advance, the picking is completed before they leave the drums. In actual practice they tend to rotate slightly with an alternating rotary motion.

If it is desired to tilt the drums toward or from each other for adjusting them for picking birds of different sizes, this can be done by rotating the adjusting rods 21, 21a. For example if the rods 21, 21a are rotated to raise the leg parts 17, the frame parts will rock around the axis of the tubes 33.

It will be seen that when the leg members 17 are raised, the outer ends of the frame members 24 and 42 will be raised, causing the members 25 to which the members 24 and 40 are attached, to rotate slightly around the tubes 33. The drums are thereby brought closer together.

Pipes 43 may be perforated and connected with a water supply, to spray water on the birds as they pass between the picker drums.

The relative positions of the drums can also be slightly modified by operating the rod 28 to raise and lower the upper member 29 of the leg member 13.

It is my purpose to cover by my claims any modification in structure or material or arrangement of parts which may be reasonably included within their scope and the scope of my invention.

I claim as my invention:

1. In a poultry picker, a pair of inclined substantially parallel drums having resilient fingers, and means for mounting the drums for adjusting them toward and from each other, said mounting means including frame elements having common pivots at the front and rear of the picker below the level of the travel of birds between the drums for picking, said pivots lying in a plane disposed between and parallel with said drums.

2. In a poultry picker, a pair of inclined substantially parallel drums having resilient fingers, a frame structure for mounting the drums for adjusting them toward and from each other, said frame structure including frame elements for supporting the respective drums, and supporting legs at the rear and front of the frame structure, said legs having vertical lengthwise adjustment and being mounted for limited tilting, said frame structure being provided with means for pivotally interconnecting the frame elements respectively at the front and rear of the picker below the level of the travel of the birds for picking, and a supporting leg below one of the pivots for supporting the frame structure.

3. In a poultry picker, a pair of substantially parallel picking drums provided with picking fingers, means for rotatably mounting the drums in inclined position for relative adjustment toward and from each other, said means including a rigid frame portion for each drum, vertically adjustable legs, each supporting a frame portion at one end of the picker, means for pivotally interconnecting the frame portions at each end of the picker, and a supporting leg below one pivot means.

4. In a poultry picker, a pair of substantially parallel picking drums provided with picking fingers, means for rotatably mounting the drums in inclined position for relative adjustment toward and from each other, said means including a rigid frame portion for each drum, vertically adjustable legs, each supporting a frame portion at one end of the picker, means for pivotally interconnecting the frame portions at each end of the picker, and a supporting leg below one pivot means, the legs at the end of the picker which has no leg below the pivot at that end, being arranged substantially closer to each other than are the adjustable legs at the other end of the picker.

5. In a poultry picker, a pair of substantially parallel picking drums provided with picking fingers, means for rotatably mounting the drums in inclined position for relative adjustment toward and from each other, said means including a rigid frame portion for each drum, vertically adjustable legs, each supporting a frame portion at one end of the picker, means for pivotally interconnecting the frame portions at each end of the picker, a supporting leg below one pivot means, said pivot means each having a tube arranged fore and aft of the picker, channel members on opposite sides of the tube, means for mounting the channel members on the tube to permit limited rotation on the tube, the channel members being respectively fixed to a frame portion.

6. In a poultry picker, a pair of substantially parallel, inclined drums, a rigid supporting frame portion for rotatably mounting each drum, spaced pivot means for interconnecting the frame portions at the opposite ends of the picker, a supporting leg for one pivot means, and vertically adjustable legs for supporting the frame portions at locations spaced laterally and outwardly from the pivot means.

7. In a poultry picker, a pair of substantially parallel, inclined drums, means for rotatably supporting the drums, said means being adapted for adjusting the drums toward and from each other and having a rigid frame portion for each drum, means for pivotally interconnecting the frame portions at each end of the picker, a supporting leg for the pivot means at one end of the picker, and a pair of vertically extensible, slightly tiltable, supporting legs for each frame portion.

8. In a poultry picker, a frame structure, said frame structure being made up of a pair of rigid frame elements, a picker drum rotatably mounted in each frame element, each picker drum being fixedly mounted with respect to its location in the respective frame element, said frame elements being pivotally interconnected on a longitudinal central axis below the level of said picker drums, and adjusting means carried by each frame element and cooperable with the surface on which the picker is supported, said adjusting means being thereby operable for tilting said frame elements with respect to each other and moving said picker drums toward and away from each other.

9. In a poultry picker, a frame structure, said frame structure being made up of a pair of rigid frame elements, a picker drum rotatably mounted in each frame element, each picker drum being fixedly mounted with respect to its location in the respective frame element, said frame elements being pivotally interconnected on a longitudinal central axis below the level of said picker drums, and means for tilting said frame elements about said axis and thereby moving said picker drums toward and away from each other.

EZRA B. MEAD.

REFERENCES CITED

The following references are of record in the file of this patent:

UNITED STATES PATENTS

| Number | Name | Date |
| --- | --- | --- |
| 1,036,959 | Burk | Aug. 27, 1912 |
| 1,217,393 | Berg | Feb. 27, 1917 |
| 1,737,225 | Dunner | Nov. 26, 1929 |
| 1,755,665 | Richards | Apr. 22, 1930 |
| 1,889,228 | Swanson | Nov. 29, 1932 |
| 2,334,714 | Knight | Nov. 23, 1943 |
| 2,422,608 | Albright | June 17, 1947 |